(12) United States Patent
Elliott et al.

(10) Patent No.: US 9,021,903 B2
(45) Date of Patent: May 5, 2015

(54) LINEAR ACTUATOR

(75) Inventors: Nicholas Elliott, Winscombe (GB); Arnaud Didey, Portsmouth (GB)

(73) Assignee: Airbus Operations Limited, Bristol (GB)

( * ) Notice: Subject to any disclaimer, the term of this patent is extended or adjusted under 35 U.S.C. 154(b) by 417 days.

(21) Appl. No.: 13/012,165

(22) Filed: Jan. 24, 2011

(65) Prior Publication Data

US 2011/0179893 A1 Jul. 28, 2011

(30) Foreign Application Priority Data

Jan. 26, 2010 (GB) .................................. 1001178.1

(51) Int. Cl.
| | | |
|---|---|---|
| *B64C 3/38* | (2006.01) | |
| *B64C 5/10* | (2006.01) | |
| *B64C 9/00* | (2006.01) | |
| *B64C 13/00* | (2006.01) | |
| *B64C 25/10* | (2006.01) | |
| *F16H 27/02* | (2006.01) | |
| *F16H 29/02* | (2006.01) | |
| *F16H 1/16* | (2006.01) | |
| *F16H 1/20* | (2006.01) | |
| *B64C 13/28* | (2006.01) | |
| *F16H 25/20* | (2006.01) | |

(52) U.S. Cl.
CPC ................ *B64C 13/28* (2013.01); *F16H 1/163* (2013.01); *F16H 25/20* (2013.01); *F16H 2025/2084* (2013.01); *F16H 2025/209* (2013.01); *Y02T 50/44* (2013.01)

(58) Field of Classification Search
CPC . F16H 25/20; F16H 25/2204; F16H 25/2015; F16H 25/24; F16H 1/163; F16H 2025/2084; F16H 2025/209; H02K 7/06; H02K 7/116; B64C 25/14; B64C 25/16; B64C 13/28; Y02T 50/44
USPC ......... 74/25, 89, 89.23, 415, 416, 425, 89.35, 74/89.37; 244/99.2, 99.3, 102 R, 102 A, 244/102 SL
See application file for complete search history.

(56) References Cited

U.S. PATENT DOCUMENTS

| | | | | |
|---|---|---|---|---|
| 2,979,034 | A * | 4/1961 | Geyer ............................... 92/17 |
| 3,523,599 | A * | 8/1970 | Denkowski ................... 192/150 |
| 4,217,788 | A * | 8/1980 | Burr et al. ........................ 74/425 |
| 5,765,668 | A * | 6/1998 | Hasselberg et al. ........... 192/223 |
| 5,809,833 | A * | 9/1998 | Newport et al. ............. 74/89.37 |
| 6,259,175 | B1 * | 7/2001 | Alfano et al. .................... 310/20 |
| 6,662,672 | B2 * | 12/2003 | Someya ........................ 74/89.23 |
| 6,670,734 | B2 * | 12/2003 | Morishima et al. ............. 310/80 |
| 6,810,985 | B1 * | 11/2004 | Budaker et al. ............... 180/444 |
| 7,641,145 | B2 * | 1/2010 | Steinberg ..................... 244/99.3 |
| 8,109,163 | B2 * | 2/2012 | Hudson et al. ............... 74/89.25 |
| 2005/0284249 | A1 * | 12/2005 | Arnone ....................... 74/490.07 |
| 2006/0081078 | A1 * | 4/2006 | Nagai et al. ................. 74/89.23 |
| 2006/0156845 | A1 * | 7/2006 | Tong ............................... 74/425 |
| 2007/0137329 | A1 * | 6/2007 | Everson et al. ............. 74/89.23 |

(Continued)

*Primary Examiner* — Justin Krause
(74) *Attorney, Agent, or Firm* — Lowe Hauptman & Ham, LLP

(57) ABSTRACT

A linear actuator has a housing, a piston slideable within the housing along a slide axis, a first shaft rotatable about a first axis substantially perpendicular to the slide axis, a second shaft rotatable about a second axis parallel to the slide axis, in which the second shaft and the piston are engaged to convert rotational motion of the second shaft into linear motion of the piston, and in which the first shaft and the second shaft are engaged by a ball-worm gear.

12 Claims, 6 Drawing Sheets

(56) References Cited

U.S. PATENT DOCUMENTS

2007/0261506 A1* 11/2007 Ymker ................. 74/89.33
2008/0098835 A1* 5/2008 Cheng ................. 74/89.38
2010/0096498 A1* 4/2010 McKay ................. 244/99.2
2010/0219290 A1* 9/2010 Luce ................. 244/102 SL
2010/0282901 A1* 11/2010 Mason ................. 244/102 R
2011/0179893 A1* 7/2011 Elliott et al. ................. 74/25

* cited by examiner

LINEAR ACTUATOR

RELATED APPLICATIONS

The present application is based on, and claims priority from, Great Britain Application Number 1001178.1, filed Jan. 26, 2010, the disclosure of which is hereby incorporated by reference herein in its entirety.

The present invention relates to a linear actuator. In particular, the present invention relates to a linear actuator comprising a ball-worm drive.

Known linear actuators are powered in a variety of ways. Hydraulic and pneumatic actuators are common, but suffer the disadvantage that a compressed fluid source is required to power them. Electric actuators are also known, powered from rotary electric motors. These devices are large and often require gearing between the motor and actuator to provide the desired torque at the desired speed.

In aircraft applications, it is often desirable to provide a high torque at a relatively low speed, because the components of an aircraft which require actuation are commonly very heavy and the applications do not demand significant speeds. One example of this is landing gear extension and retraction.

In theory, as the gear ratio increases, the motor can be made smaller because the torque is increased. However, there is a point at which the weight saved by the reduction in motor size is negated by the increasing size of the gearbox. Therefore motors still tend to be large and heavy as the gearbox required to make them any smaller is too large itself to justify the design change.

Increasing the size of the gearbox also increases the number of components that could potentially fail, and also increases the amount of packaging space required by the actuator.

It is an aim of the present invention to provide an improved linear actuator.

According to a first aspect of the invention there is provided a linear actuator comprising a housing, a piston slideable within the housing along a slide axis, a first shaft rotatable about a first axis, a second shaft rotatable about a second axis transverse to the first axis, in which the second shaft and the piston are engaged to convert rotational motion of the second shaft into linear motion of the piston along the slide axis, and in which the first shaft and the second shaft are engaged by a ball-worm gear.

The ball-worm gear provides a compact, simple arrangement with a high gear ratio that only requires small actuators to provide a high torque at a relatively low speed, ideal for aircraft actuation applications.

Figure 1A:
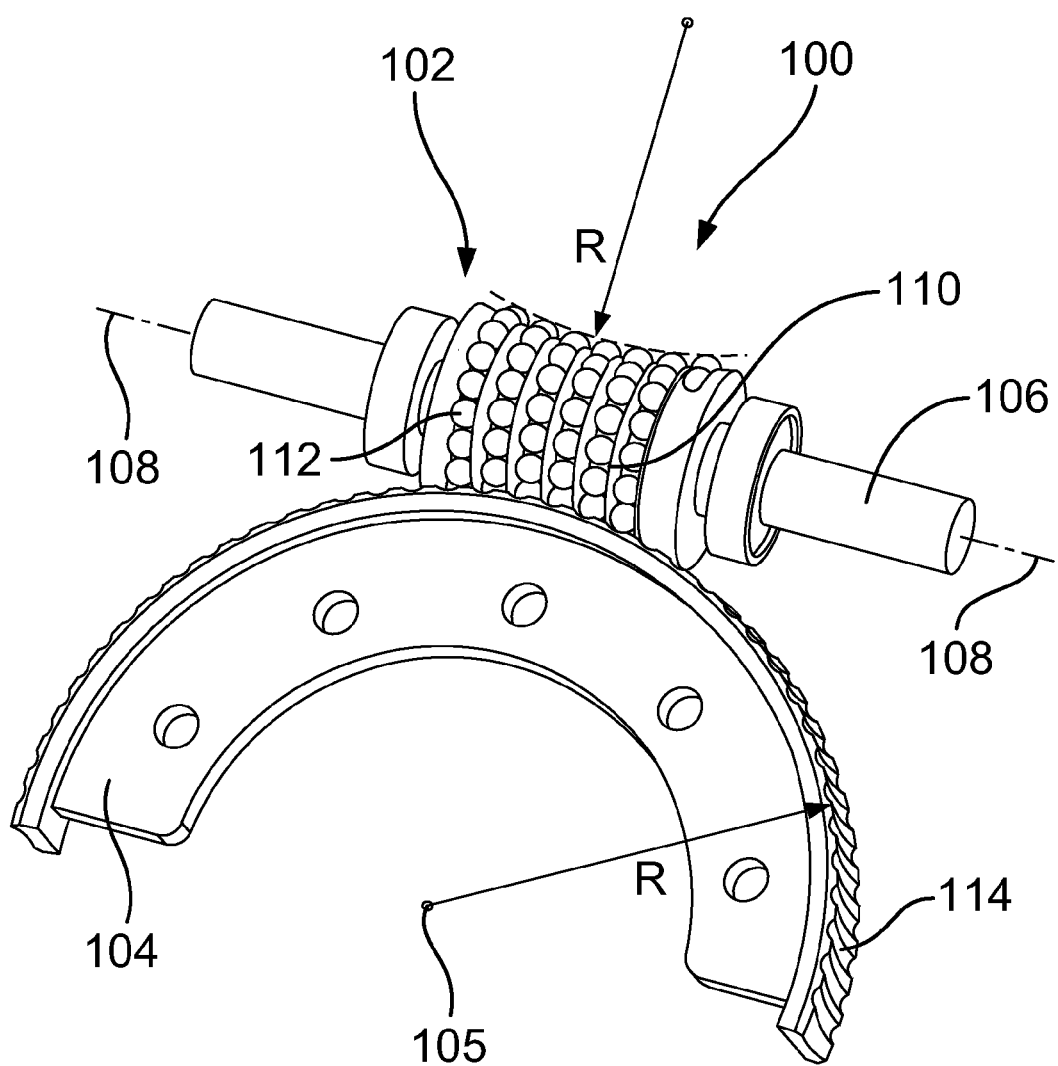
Figure 1B:
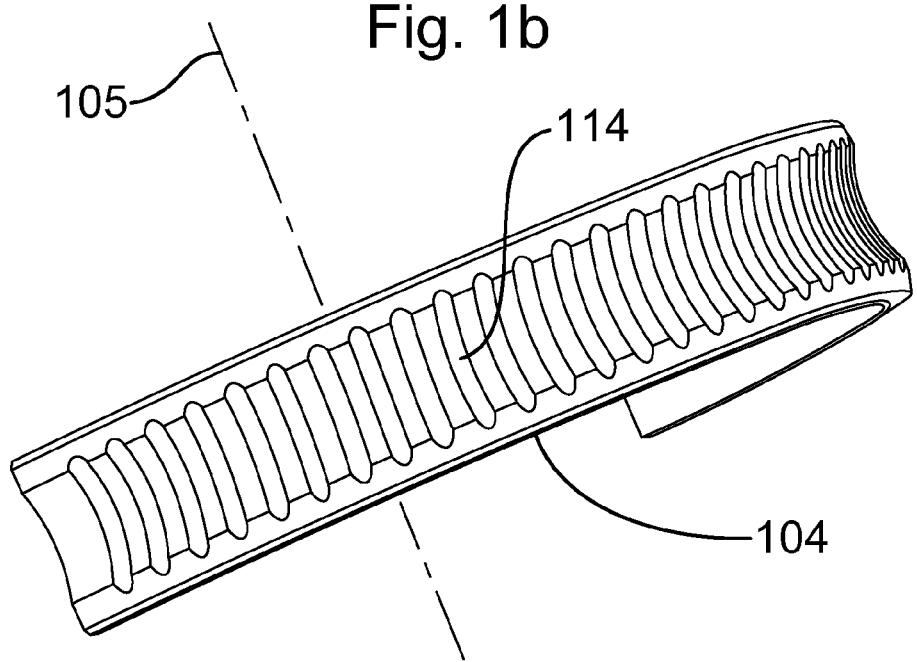
Figure 1C:
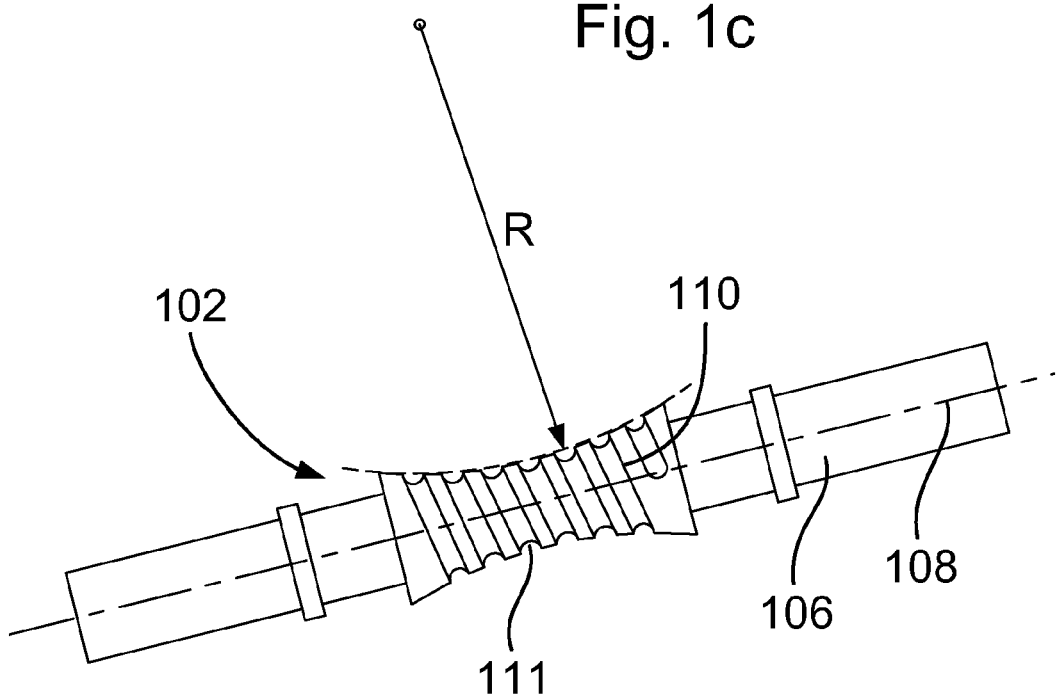
Figure 2:
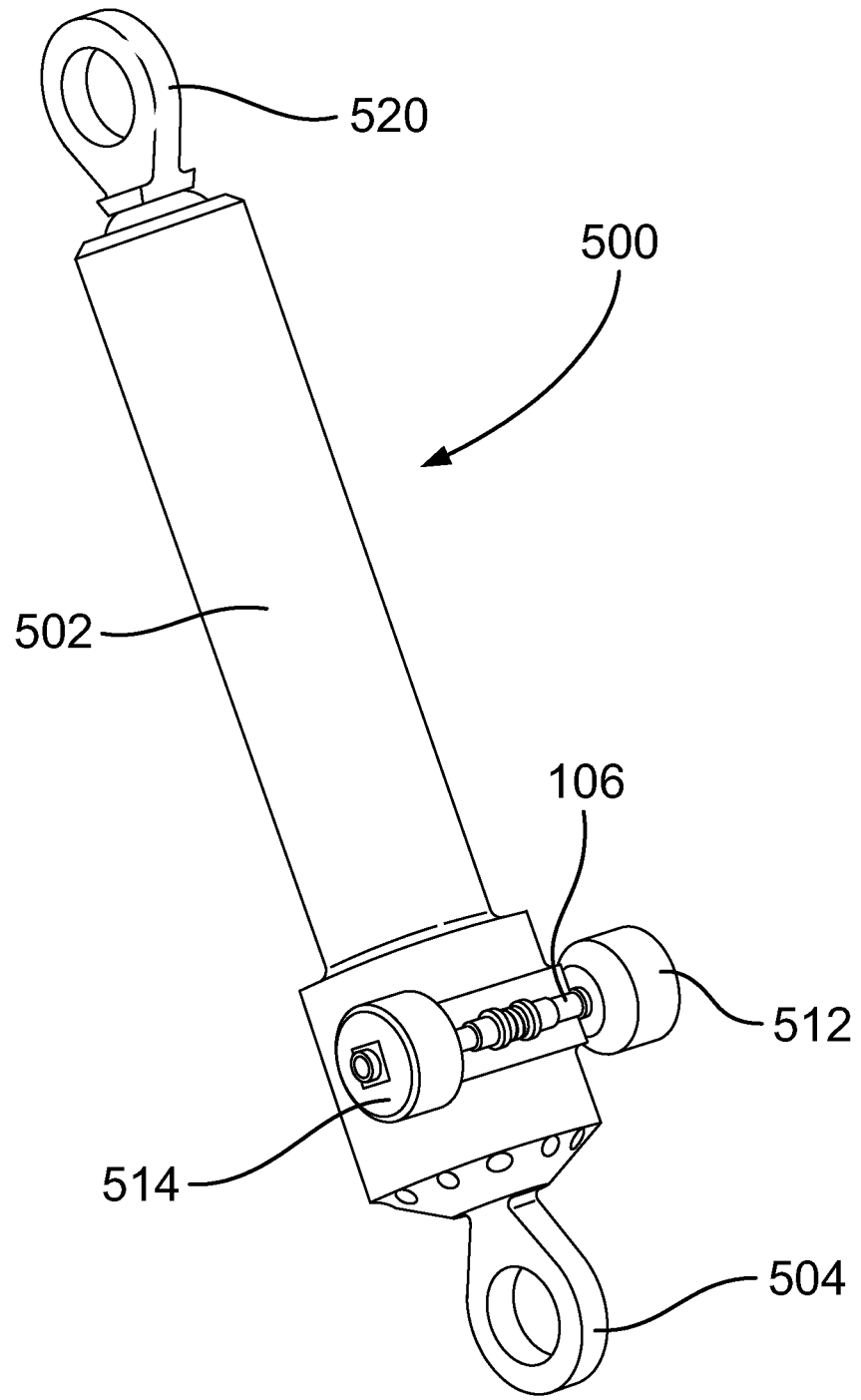
Figure 3:
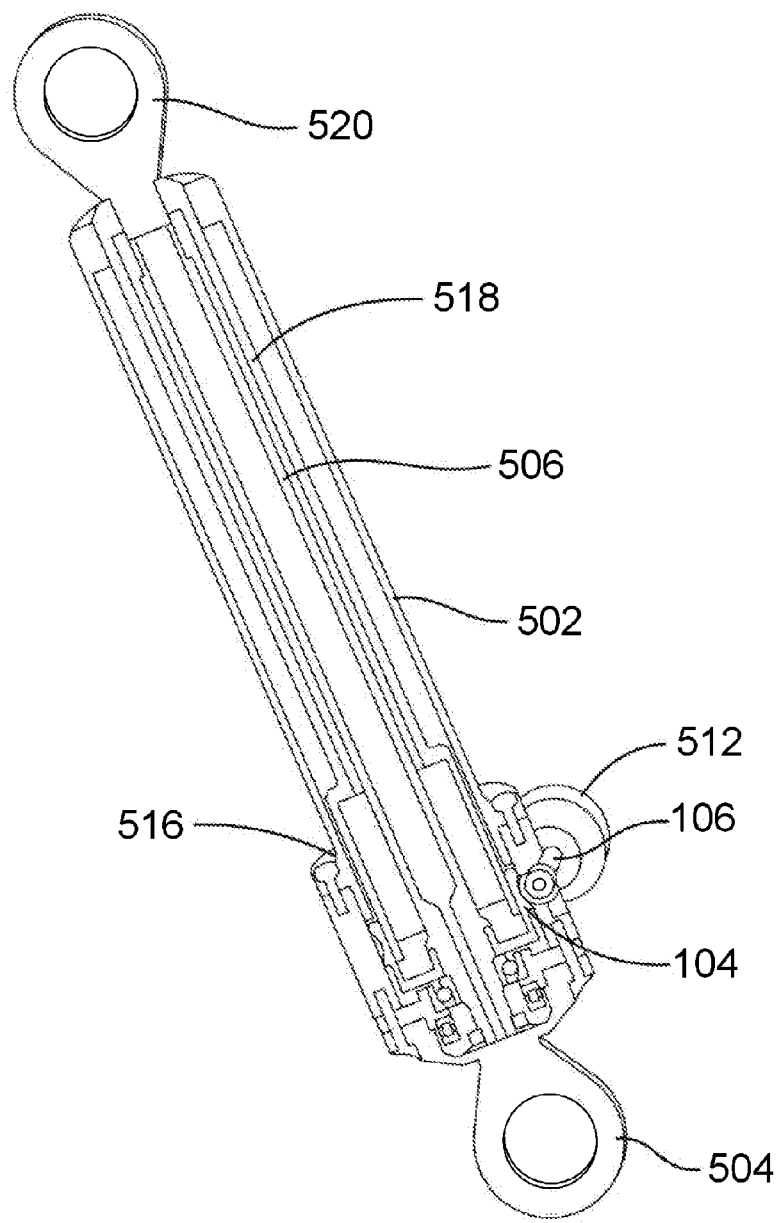
Figure 4:
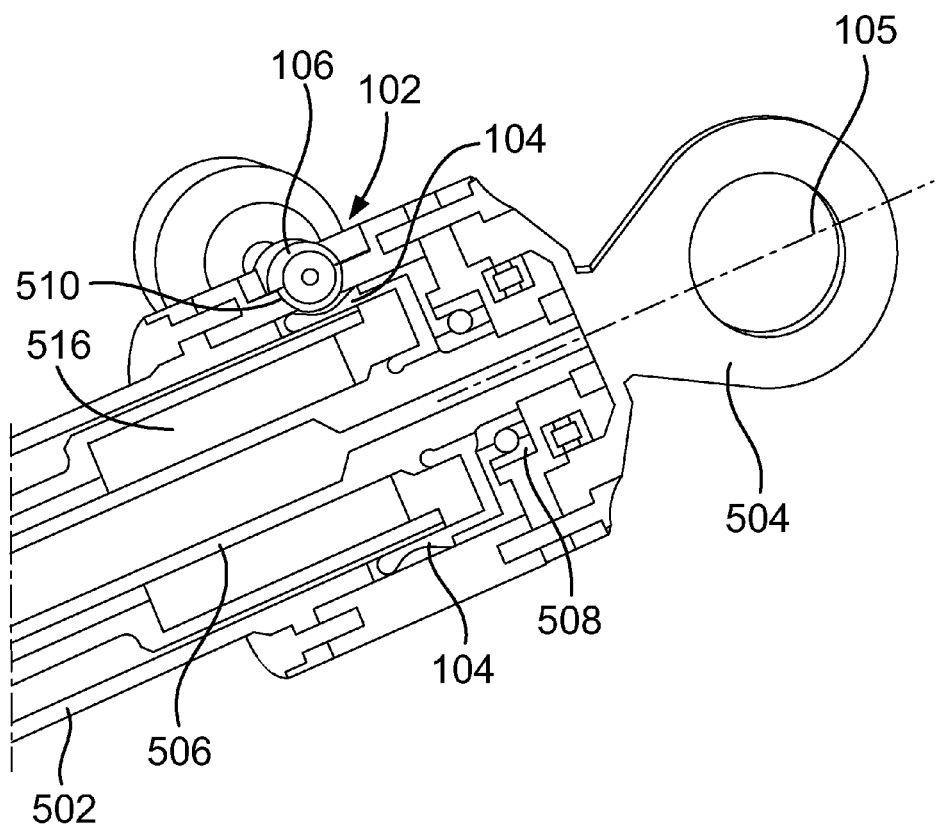
Figure 5:
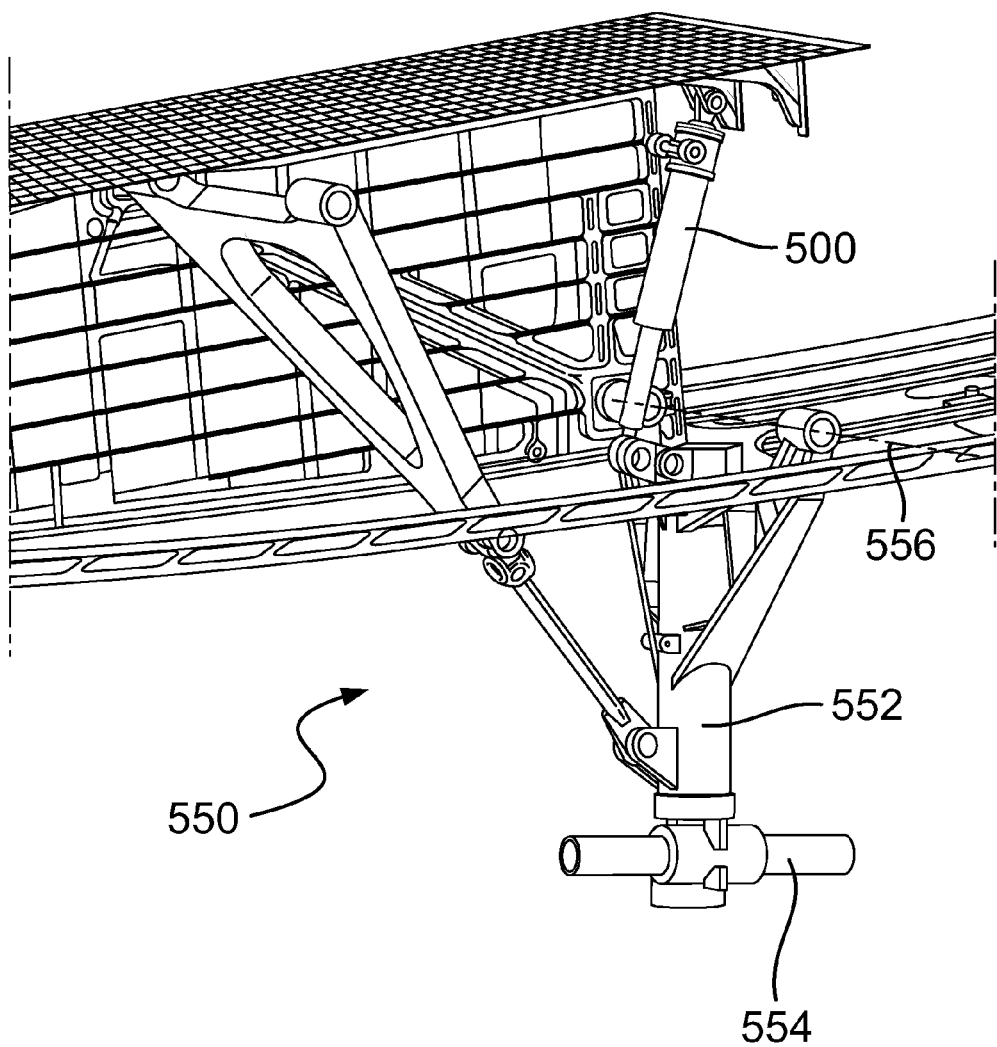

An example linear actuator in accordance with the present invention will now be described with reference to the accompanying drawings in which:

FIG. 1*a* is a perspective view of a ball-worm assembly,

FIG. 1*b* is a part of the ball-worm assembly of FIG. 1*a*,

FIG. 1*c* is a further part of the ball-worm assembly of FIG. 1*a*,

FIG. 2 is a perspective view of a linear actuator in accordance with the present invention, FIG. 3 is a section view of the linear actuator of FIG. 2, FIG. 4 is a section view of a part of the linear actuator of FIG. 2, FIG. 5 is a perspective view of a landing gear assembly comprising the linear actuator of FIG. 2.

A ball-worm assembly 100 used in the present invention is shown in FIG. 1. The assembly comprises a driving shaft assembly 102 and a driven shaft 104. The driving shaft assembly 102 (also shown in FIG. 1*c*) comprises a driving shaft 106 defining a driving axis 108. A ball race 110 is attached to the driving shaft 106. The ball race is generally rotationally symmetric and defines a concave outer profile with radius R. A helical ball channel 111 surrounds the ball race 110 about the driving axis 108. A plurality of bearing balls 112 sit within the channel and are encased by a housing (not shown) so that they can move only along the path defined by the channel. The housing includes a recirculation system to provide the balls 112 with the ability to move along the channel in use.

The driven shaft 104 has an outer radius R and defines a driven axis 105. The driven shaft 104 defines a series of axial ball tracks 114 on its outer surface. When the race 110 and the driven shaft 114 are placed in close proximity, the channel and the tracks 114 define a path for the balls 112.

When the driving shaft is rotated, a circumferential force about driven axis 105 is applied to the axial ball tracks 114 of the driven shaft 104 by the balls 112 because they move in a helical path around the ball race 110. Torque is therefore transmitted through the race 110 to the balls 112 and consequently to the driven shaft 104. The ball-worm gear 100 provides a gear reduction from the driving shaft 106 to the driven shaft 104 and transfers the drive through 90 degrees from the axis 108 to the axis 105. Therefore a high speed, low torque input from the driving shaft 106 is geared to a low speed, high torque output at the driven shaft 104.

Turning to FIGS. 2 to 5, a linear actuator 500 is shown. The actuator 500 comprises a housing 502 comprising a first mounting formation 504. The housing 500 is generally cylindrical and hollow.

The actuator 500 comprises a central shaft 506 rotatably mounted therein on a roller bearing 508. The central shaft 506 is coupled to the second shaft 104 of the aforementioned ball-worm arrangement.

The driving shaft assembly 102 is mounted to the exterior of the housing 502 and the ball-worm gear engages the second shaft 104 through an aperture 510 in the housing outer wall. A first motor 512 and a second motor 514 are mounted to the housing 502 and drivingly connected to the shaft 106. Therefore upon activation of the motors 512, 514, the second shaft 104 and the central shaft 506 rotate about the axis 105.

A roller nut 516 is assembled on an outer surface of the central shaft 506 engaged therewith. The roller nut 516 engages with the central shaft 506 to form a ball screw joint in known fashion. The roller nut 516 is connected to a piston 518 which surrounds and is concentric with the central shaft 506. A second mounting formation 520 is mounted to the end of the piston 518. The assembly of the second mounting formation 520, piston 518 and roller nut 516 is keyed to the housing 502 such that it can slide within the housing 502 along a slide axis (coincident with axis 105) but cannot rotate relative thereto.

Therefore, as the central shaft 506 is rotated, the piston 506 is extended from the housing 502 and the actuator is extended. Rotation in the opposite direction will retract the piston 506.

It will be understood that the rotational-linear joint between the central shaft and piston may be achieved in any known manner, e.g. through a simple threaded connection (acme screw), or roller screw.

Turning to FIG. 5, a landing gear assembly 550 is shown. The assembly 550 comprises a landing gear strut 552 extending to a landing gear wheel mounting formation 554. The strut is mounted to rotate about an axis 556 between a deployed (shown) position in which the strut is vertical and a stowed position in which the strut is horizontal within the aircraft fuselage. Rotation about the axis 556 is achieved by actuation of the linear actuator 500 between its extended condition (shown) and a retracted condition.

In the above embodiments, the driven and driving shafts have been arranged perpendicularly. Further, the driven shaft has been arranged parallel to the slide axis. It will be understood that this is not necessary for functioning of the invention, and the shafts need only be transverse—i.e. relatively oriented to the extent that a driving connection can be made between them. This may require the use of extra componentry—for example the mechanical formations of the ball-worm may need to be a different form, or a universal joint may need to be installed between the driven shaft and the landing gear axle.

The piston may be any kind of linearly movable rod.

The invention claimed is:

1. An extensible linear actuator, comprising:
a subassembly of a first shaft rotatable about a first axis and at least one electric motor driving the first shaft,
a housing having an outer wall,
a rod slideable along a slide axis within the housing,
a second shaft in the housing, the second shaft rotatable about a second axis transverse to the first axis,
the second shaft and the rod being engaged via a screw joint to convert rotational motion of the second shaft into linear motion of the rod along the slide axis, wherein the rod is telescopic within the housing so as to change the length of the linear actuator, and
the linear actuator further comprising a ball-worm gear comprising a first mechanical engagement formation on the first shaft, a second mechanical engagement formation on the second shaft, and a plurality of balls engaging the first and second mechanical engagement formations wherein the subassembly is mounted to the outer wall of the housing, and the housing defines an aperture in the outer wall exposing the mechanical engagement formation on the second shaft, and the first mechanical engagement formation engages the second mechanical engagement formation through the aperture via the ball-worm gear.

2. The linear actuator according to claim 1 in which the first axis is substantially perpendicular to the second axis.

3. The linear actuator according to claim 1 in which the second axis and the slide axis are parallel.

4. The linear actuator according to claim 3 in which the second axis and the slide axis are coincident.

5. The linear actuator according to claim 1 in which the screw joint is a ball-screw joint.

6. The linear actuator according to claim 5 in which the second shaft is connected to a shaft of the ball screw joint and the rod is connected to a nut of the ball screw joint.

7. The linear actuator according to claim 6 in which the rod at least partially surrounds the shaft of the ball screw joint.

8. The linear actuator according to claim 1 comprising a first motor and a second motor mounted at a first end and a second end of the first shaft respectively, on either side of the housing.

9. An aircraft actuation subassembly comprising the linear actuator according to claim 1.

10. An aircraft landing gear assembly comprising the aircraft actuation subassembly according to claim 9.

11. The linear actuator according to claim 1, wherein the mechanical engagement formation on the first shaft defines a concave outer profile to receive part of the mechanical engagement formation of the second shaft.

12. The linear actuator according to claim 11, wherein the concave outer profile has substantially the same radius as the second shaft.

* * * * *